United States Patent [19]

Schimmel et al.

[11] Patent Number: 4,762,693

[45] Date of Patent: Aug. 9, 1988

[54] PROCESS FOR WORKING UP HEAVY METAL-CONTAINING RESIDUES ORIGINALLY FROM THE DECONTAMINATION OF CRUDE PHOSPHORIC ACID

[75] Inventors: Günther Schimmel; Reinhard Gradl, both of Erftstadt; Friedrich Kolkmann, Brühl, all of Fed. Rep. of Germany

[73] Assignee: Hoechst Aktiengesellschaft, Hurth Knapsack, Fed. Rep. of Germany

[21] Appl. No.: 39,792

[22] Filed: Apr. 16, 1987

Related U.S. Application Data

[63] Continuation of Ser. No. 873,427, Jun. 12, 1986, abandoned.

[30] Foreign Application Priority Data

Jun. 26, 1985 [DE] Fed. Rep. of Germany ........ 3522822

[51] Int. Cl.$^4$ ............................................. C01B 25/46
[52] U.S. Cl. .............................. 423/321 S; 423/658.5; 210/634; 210/688
[58] Field of Search ..................... 423/24, 42, 87, 100, 423/101, 321 R, 321 S, 658.5, DIG. 14; 210/634, 688; 75/101 BE

[56] References Cited

U.S. PATENT DOCUMENTS

| | | | |
|---|---|---|---|
| 4,452,768 | 5/1984 | Gradl et al. | 423/321 R |
| 4,466,948 | 8/1984 | Schimmel et al. | 423/321 R |
| 4,503,016 | 3/1985 | Schimmel et al. | 423/321 S |
| 4,596,703 | 6/1986 | Gradi et al. | 423/321 S |

*Primary Examiner*—Robert L. Stoll

[57] ABSTRACT

Residue obtained upon the removal of heavy metal contaminants from crude phosphoric acid by means of a dialkyldithiophosphoric acid ester and adsorbent is worked up into ecologically reliable solid matter and into a heavy metal concentrate. The solid matter and heavy metal concentrate are separated from one another by successive mechanical and chemical treatment. The sequential order of these two operational steps can be inversed.

3 Claims, No Drawings

PROCESS FOR WORKING UP HEAVY METAL-CONTAINING RESIDUES ORIGINALLY FROM THE DECONTAMINATION OF CRUDE PHOSPHORIC ACID

This case is a continuation of our copending application, Ser. No. 873,427, filed June 12, 1986, now abandoned.

This invention relates to a process of working up, i.e. concentrating, heavy metal-containing residues obtained on subjecting crude phosphoric acid to extractive decontamination using a dialkyldithiophosphoric acid ester and an adsorbent.

The removal of heavy metals, especially cadmium, from phosphoric acid is gaining increasing interest for ecological reasons as phosphoric acid derivatives, especially mineral fertilizers, make it possible for them to get into the chain of food.

Various such processes have already been described, wherein crude phosphoric acid is treated using a dialkyldithiophosphoric acid ester in combination with one or more fine particulate adsorbents and phosphoric acid substantially free from heavy metals is ultimately obtained (cf. EP-0 085 344 A2, EP-0 099 514 A1, DE-32 12 675 A1, corresponding to U.S. Pat. Nos. 4,452,768, 4,466,948 and 4,479,924, respectively).

In these processes, a heavy metal-containing residue, e.g. a filter cake, very variable in composition depending upon the following typical parameters is obtained:

(1) Content of organic impurities in the crude phosphoric acid,
(2) content of heavy metals in crude acid,
(3) quantity of dialkyldithiophosphoric acid ester used,
(4) nature and quantity of adsorbent used,
(5) extent of scrubbing filter cake and hence quantity of phosphoric acid adhering thereto.

The quantitative composition of these residues may vary within wide limits and depends on the particular method used to decontaminating the crude phosphoric acid.

Residues with relatively important proportions of heavy metal and organic substances are obtained, for example, in all those cases in which the crude acid is extracted with an undilute dialkyldithiophosphoric acid ester, the heavy metal-containing ester phase is separated, and the phosphoric acid is subsequently freed from minor residual quantities of extractant by admixing it naturally with a minor quantity of adsorbent, filtering and admixing the filter cake with the ester phase initially separated with formation of a relatively solid mixture.

The object of this invention is to provide a process of working up heavy metal-containing residues customarily obtained on subjecting crude phosphoric acid to extractive decontamination using a dialkyldithiophosphoric acid ester in combination with an adsorbent, the residues consisting substantially of the ester and adsorbent. More particularly, the invention provides for the heavy metals to be separated from the residues, to be subsequently concentrated and used for the commercially attractive recovery of metals, or for deposition in fairly small spaces on special deposition sites; the invention also provides for residue constituents other than the heavy metals to be recycled into the crude phosphoric acid extractive decontamination stage.

This object can unexpectedly be achieved in accordance with this invention by separating the residue into its essential constituents.

To this end, the invention provides for two routes A or B to be followed.

Route A provides for the residue to be suspended in water resulting in the formation of a liquid aqueous phase, organic phase and solid phase consisting of the adsorbent. Next, the adsorbent is (1) either separated from the suspension prior to separating the two liquid phases from one another or (2) the organic phase is separated from the altogether 3 phases obtained and the adsorbent is subsequently separated from the remaining aqueous phase. Next, in operational step (3) the aqueous phase obtained as under (1) or (2) in the form of dilute phosphoric acid is recycled into the crude phosphoric acid extractive decontamination stage and the organic phase consisting of the heavy metal-containing dialkyldithiophosphoric acid ester is either (a) directly used as such, i.e. for metallurgical purposes, or (b) converted by thermolysis or oxidation into a heavy metal concentrate or (c) mixed with a small quantity of pulverulent solid matter and made into an easy-to-handle solid product.

Route B provides for the residue to be (1) treated for as long as necessary to destroy the heavy metal/dialkyldithiophosphoric acid ester-complex with an oxidant—which may be used in the form of an aqueous solution—and for the adsorbent to be separated from the aqueous salt solution obtained. If deemed desirable or necessary, it is (2) possible for the salt concentration of the aqueous salt solution containing free adsorbent to be increased by circulating it while removing just a portion thereof, consumed oxidant being simultaneously replaced. A step (3) ultimately provides for heavy metal hydroxides or salts to be recovered by neutralizing or evaporating the salt solution separated or removed.

As provided for in (C), the adsorbent separated as under (A) or (B) is ultimately deposited as ecologically reliable material or recycled into the crude phosphoric acid extractive decontamination stage.

The step of oxidatively working up the organic phase can be carried out using oxidants permitting the heavy metal/thioester-complex to be destroyed, e.g. nitric acid, chlorine, hypochlorite, chlorate or also a peroxo-compound.

The following statements are intended to summarize the basic idea underlying the process of this invention and its beneficial effects.

It is desirable for heavy metal-containing filtered sludges obtained upon the removal of heavy metals from phosphoric acid by means of a dialkyldithiophosphoric acid ester and adsorbent to be converted to ecologically reliable solid matter and to be worked up into a heavy metal concentrate.

The present process enables the bulk of the heavy metals initially present to be converted to a reliable deposition product or to material which can be recycled and separated. The heavy metal concentrate with its high metal content can be used as a raw material in the metal-producing industries.

Solid matter and heavy metal concentrate are separated successively, namely mechanically and chemically. The sequential order of these two operational steps can be inversed.

Thus, for example, the adsorbent and heavy metal fraction are first separated mechanically and then worked-up chemically or the original filter cake is first subjected to oxidative-chemical treatment and then separated mechanically, e.g. by filtration. It is also possible for it to be subjected to an additional precipitating or concentrating processing step.

The following Examples illustrate the invention, the percentages being by weight unless otherwise stated.

EXAMPLE 1

(oxidizing with chlorine)

500 g filter cake (3.3% $P_2O_5$; 6.8% $C_{org.}$; 0.06% Cd; 0.05% Cu; 0.07% Zn) obtained on subjecting Florida crude phosphoric acid (30% $P_2O_5$) to demetallization with addition of perlite was suspended in 250 g water and chlorine gas was injected via a frit over a period of 5 hours at 80° C. with thorough agitation. After cooling to room temperature, the whole was filtered.

320 g filter cake practically free from heavy metal with 10.5% $C_{org.}$ and 485 g filtrate in which all of the heavy metals and phosphate were dissolved (2.6% $P_2O_5$; 0.06 g $C_{org.}$; 0.06% Cd; 0.05% Cu; 0.07% Zn; 11.8% $Cl^-$) were obtained.

EXAMPLE 2

(precipitating and concentrating)

200 g filtrate of Example 1 was neutralized with 50% sodium hydroxide solution to pH 9 and heavy metal hydroxides and phosphates were found to precipitate. The whole was filtered while hot and washed with 10 ml water. The filter cake dried at 80° C. weighed 29.4 g and contained 0.41% Cd and 0.34% Cu. The filtrate which was a dilute disodium phosphate solution was recycled into the crude phosphoric acid.

EXAMPLE 3

(oxidizing with nitric acid)

500 g washed filter cake (5.9% $P_2O_5$; 11.4% $C_{org.}$; 0.15% Cd; 0.22% Cu) obtained on subjecting Morocco crude acid (50% $P_2O_5$) to demetallizing treatment with addition of perlite, and 1500 g nitric acid (15% $HNO_3$) were stirred over a period of 1.5 h at 40° C.

229 g filter cake free from heavy metal, containing 24.1% $C_{org.}$ and 1750 g filtrate in which all of the heavy metals and phosphate were dissolved (1.6% $P_2O_5$; 0.05% $C_{org.}$; 0.042% Cd; 0.062% Cu) were obtained.

EXAMPLE 4

(precipitating and concentrating)

500 g filtrate of Example 3 was neutralized with 50% sodium hydroxide solution to pH 8.5 and the suspension was filtered while hot using a pressure filter. The filtrate was free from heavy metal (less than 1 ppm Cu, less than 1 ppm Cd).

52 g moist filter cake was obtained. It was dried at 80° C. and 11 g dry filter cake containing 1.9% Cd and 2.8% Cu remained behind.

EXAMPLE 5

(phase separation)

200 g filter cake obtained on subjecting phosphoric acid to demetallization with perlite and 200 g water were thoroughly stirred over a period of 2 hours at 50° C. Next, the whole was allowed to deposit. A three phase mixture consisting of an upper black organic phase, a middle aqueous phase and a solid phase was obtained.

The organic phase was skimmed off (24.6 g) and the mixture of dilute phosphoric acid and perlite was separated by filtration, 112 g filter cake (45% adhering water) and 262 g aqueous phase containing 4.3% $P_2O_5$ were obtained.

The organic phase contained 3.3% Cu and 2.4% Cd. The filter cake was practically free from heavy metal and was used again for freeing crude phosphoric acid from cadmium. The dilute phosphoric acid filtrate was recycled into the crude phosphoric acid.

EXAMPLE 6

(oxidizing organic phase)

20 g phosphoric acid thioester-phase containing heavy metal (3.3% Cu; 2.4% Cd) precipitated as described in Example 5 and 10 g 20% nitric acid were thoroughly stirred over a period of 1 h at room temperature.

A two phase mixture consisting of 17.5 g organic phase free from heavy metal and 12.3 g aqueous phase in which all of the heavy metals were dissolved (5.3% Cu; 3.9% Cd) was obtained.

A heavy metal hydroxide concentrate was prepared therefrom by precipitation with an alkaline liquor.

EXAMPLE 7

(subjecting organic phase to thermolysis)

20 g organic phase of Example 6 was placed in a dish, gradually heated to 400° C. in a muffle furnace, and maintained at that temperature over a period of 2 h.

A residue of 3.8 g containing 17.4% Cu and 12.5% Cd remained behind.

EXAMPLE 8

(solidifying organic phase)

20 g organic phase of Example 6 was kneaded with various pulverulent solid substances until a friable solid mass was obtained. The following substances were used in the following quantities:

| Substance | Quantity | Content in final product | |
|---|---|---|---|
| | | % Cu | % Cd |
| Hydrate of lime | 37.4 g | 1.1 | 0.8 |
| Pulver active carbon | 8.8 g | 2.3 | 1.7 |
| Perlite | 9.1 g | 2.3 | 1.6 |

An organic phase containing heavy metal obtained on subjecting phosphoric acid to extraction using a pure dialkyldithiophosphoric acid ester can be solidified in analogous manner.

We claim:

1. A process of working up a heavy metal-containing residue obtained on subjecting crude phosphoric acid to extractive decontamination in an extractive decontamination stage using a dialkyldithiophosphoric acid ester in combination with an adsorbent, the residue consisting substantially of the adsorbent and the said ester containing heavy metal values extracted from the phosphoric acid which process comprises recovering the said heavy metals by treating the residue with an oxidant until the said ester is destroyed, with the resultant formation of an aqueous suspension of the adsorbent in a salt solution also formed thereby, separating the adsorbent from the salt solution thus obtained, discarding or recycling the separated adsorbent into the extractive decontamination stage, removing the salts from the solution by evaporating the solution or neutralizing the salt solution and separating therefrom heavy metal oxides or hydroxides being formed.

2. The process according claim 1, wherein chlorine, nitric acid, hypochlorite, chlorate or a peroxo-compound are used as oxidant.

3. A process according to 1, comprising the steps of:
(a) recovering a heavy metal-containing sludge as a byproduct of the process for decontaminating phosphoric acid, said heavy metal-containing sludge comprising said adsorbent and heavy metal/dialkyldithiophosphoric acid ester complex,
(b) obtaining a heavy metal concentrate from said sludge by:

treating the sludge with an aqueous solution of an oxidant until the ester portion of the said complex is destroyed, whereby an aqueous mixture of dissolved heavy metal salts and free solid adsorbent is formed, separating the adsorbent from the mixture, and converting th aqueous salt solution to a heavy metal concentrate by evaporating the water from said solution or by converting the heavy metal salts to substantially insoluble oxides or hydroxides and separating said oxides or hydroxides from the water.

* * * * *

UNITED STATES PATENT AND TRADEMARK OFFICE
CERTIFICATE OF CORRECTION

PATENT NO. : 4,762,693
DATED : August 9, 1988
INVENTOR(S) : Gunther Schimmel, Reinhard Gradl, Friedrich Kolkmann It is certified that error appears in the above-identified patent and that said Letters Patent is hereby corrected as shown below:

On the title page:

Item 56, last line should read: "4,596,703 6/1986 Gradl et al.. 423/321S".

Signed and Sealed this

Twenty-sixth Day of September, 1989

Attest:

DONALD J. QUIGG

Attesting Officer

Commissioner of Patents and Trademarks